United States Patent
Zantz

(10) Patent No.: US 9,701,396 B2
(45) Date of Patent: Jul. 11, 2017

(54) JOINT ARRANGEMENT, DRIVE SYSTEM FOR DRIVING CONTROL SURFACES OF AN AIRCRAFT AND AIRCRAFT WITH SUCH A DRIVE SYSTEM

(71) Applicant: Airbus Operations GmbH, Hamburg (DE)

(72) Inventor: Tanno Zantz, Achim (DE)

(73) Assignee: Airbus Operations GmbH (DE)

( * ) Notice: Subject to any disclaimer, the term of this patent is extended or adjusted under 35 U.S.C. 154(b) by 682 days.

(21) Appl. No.: 14/291,198

(22) Filed: May 30, 2014

(65) Prior Publication Data

US 2016/0039516 A1 Feb. 11, 2016

(30) Foreign Application Priority Data

May 31, 2013 (EP) .................................. 13 169 964

(51) Int. Cl.
| | |
|---|---|
| *B64C 13/28* | (2006.01) |
| *F16D 3/223* | (2011.01) |
| *F16D 3/24* | (2006.01) |
| *F16D 3/10* | (2006.01) |
| *F16D 3/2233* | (2011.01) |
| *F16D 3/224* | (2011.01) |

(52) U.S. Cl.
CPC ................ *B64C 13/28* (2013.01); *F16D 3/10* (2013.01); *F16D 3/224* (2013.01); *F16D 3/2233* (2013.01); *F16D 3/24* (2013.01); *F16D 2003/22303* (2013.01); *Y10S 464/906* (2013.01)

(58) Field of Classification Search
CPC ......... B64C 13/28; F16D 3/10; F16D 3/2233; F16D 3/224; F16D 3/24; F16D 2003/22303; F16D 2003/2232; Y10S 464/906

USPC .......................................... 464/139–146, 906
See application file for complete search history.

(56) References Cited

U.S. PATENT DOCUMENTS

| | | | | |
|---|---|---|---|---|
| 1,324,315 | A | * | 12/1919 | Lavigne .................. F16D 3/221 464/141 |
| 1,498,171 | A | * | 6/1924 | Kaps ....................... F16D 3/221 464/141 |
| 1,916,442 | A | | 7/1933 | Rzeppa |
| 2,072,843 | A | * | 3/1937 | Stack ........................ F16D 3/50 464/139 |

(Continued)

FOREIGN PATENT DOCUMENTS

| | | |
|---|---|---|
| DE | 3 620 886 C2 | 3/1989 |
| DE | 3907257 A1 * | 9/1990 ............. F16D 3/065 |

(Continued)

OTHER PUBLICATIONS

European Search Report (EP 13 169 964.7) (Nov. 12, 2013).

*Primary Examiner* — Josh Skroupa
(74) *Attorney, Agent, or Firm* — Lerner, David, Littenberg, Krumholz & Mentlik, LLP

(57) ABSTRACT

A joint arrangement includes an outer joint component, an inner joint component, a cage and at least two balls located between the outer and inner joint component and in openings of the cage. The balls run in ball recesses, while at least two are in a mechanical contact with pressing devices, which are adapted for holding the respective balls in a radially flexible position relative to one of the inner joint component, the outer joint component and the cage and for pressing the respective balls into the corresponding recesses.

14 Claims, 9 Drawing Sheets

(56) References Cited

U.S. PATENT DOCUMENTS

| | | |
|---|---|---|
| 4,432,741 A | 2/1984 | Winkler |
| 4,786,013 A | 11/1988 | Pohl |
| 7,048,234 B2 | 5/2006 | Recksiek et al. |

FOREIGN PATENT DOCUMENTS

| | | | | |
|---|---|---|---|---|
| EP | 0 345 840 A1 | 12/1989 | | |
| EP | 0 908 639 A2 | 4/1999 | | |
| EP | 1 462 361 B1 | 6/2006 | | |
| FR | 1505002 A | * 12/1967 | ............... | F16D 3/22 |
| WO | 2008/080709 A1 | 7/2008 | | |

\* cited by examiner

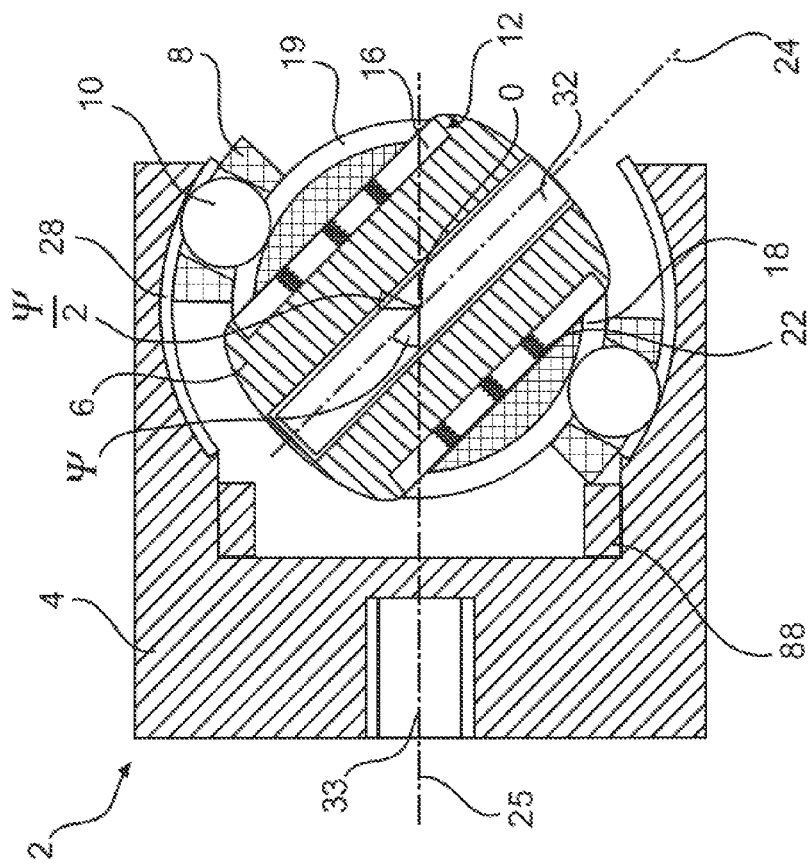
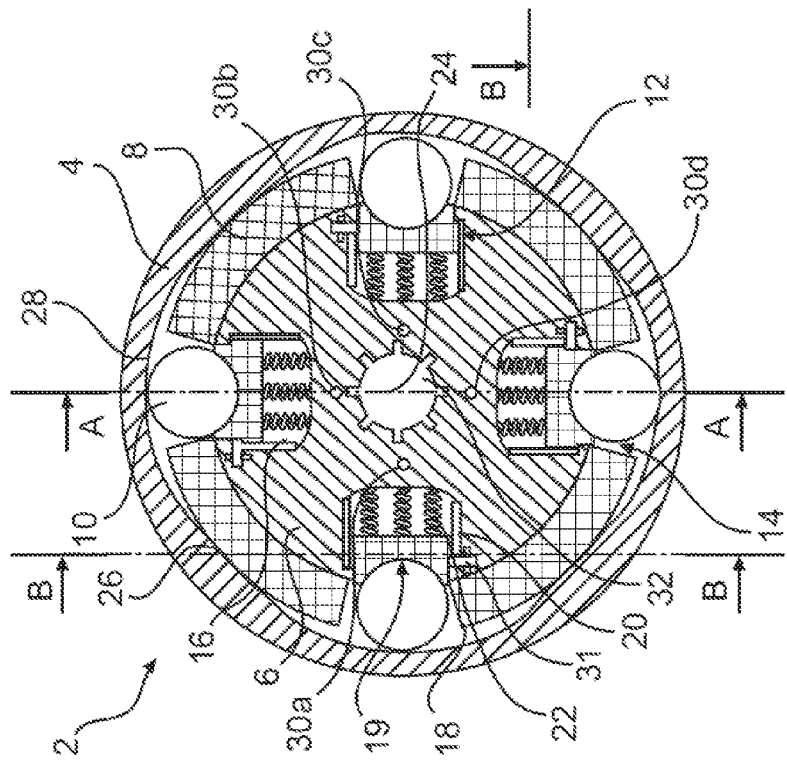

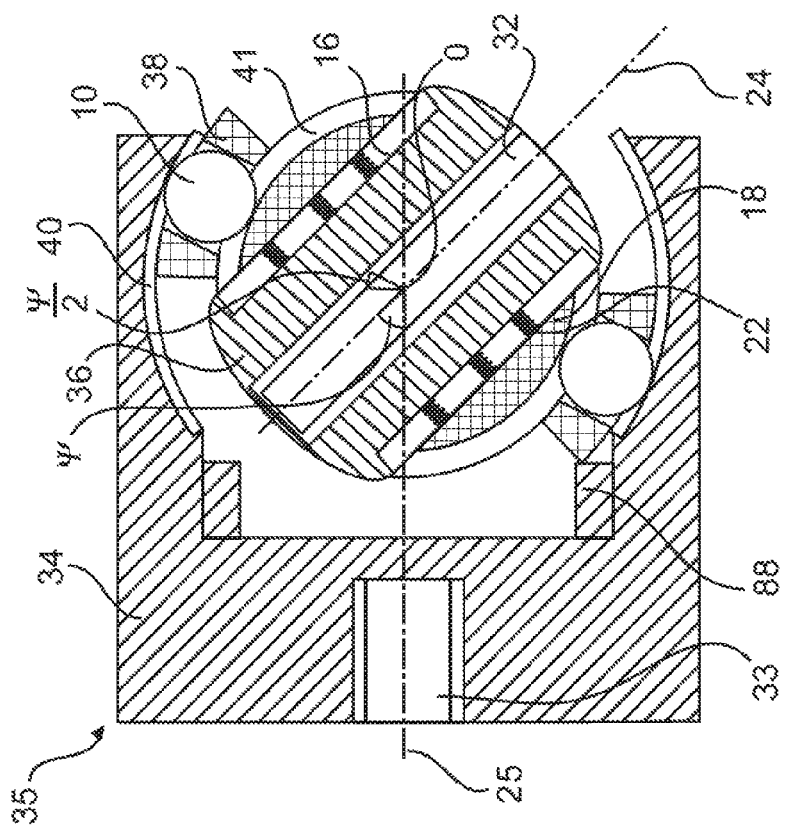
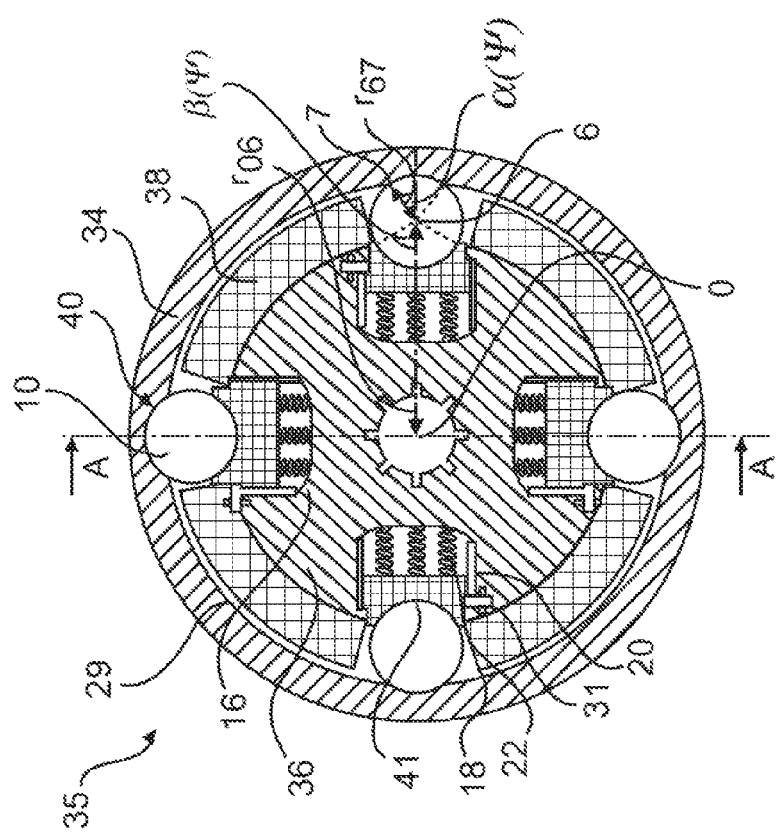
Fig.2a
Fig.2b

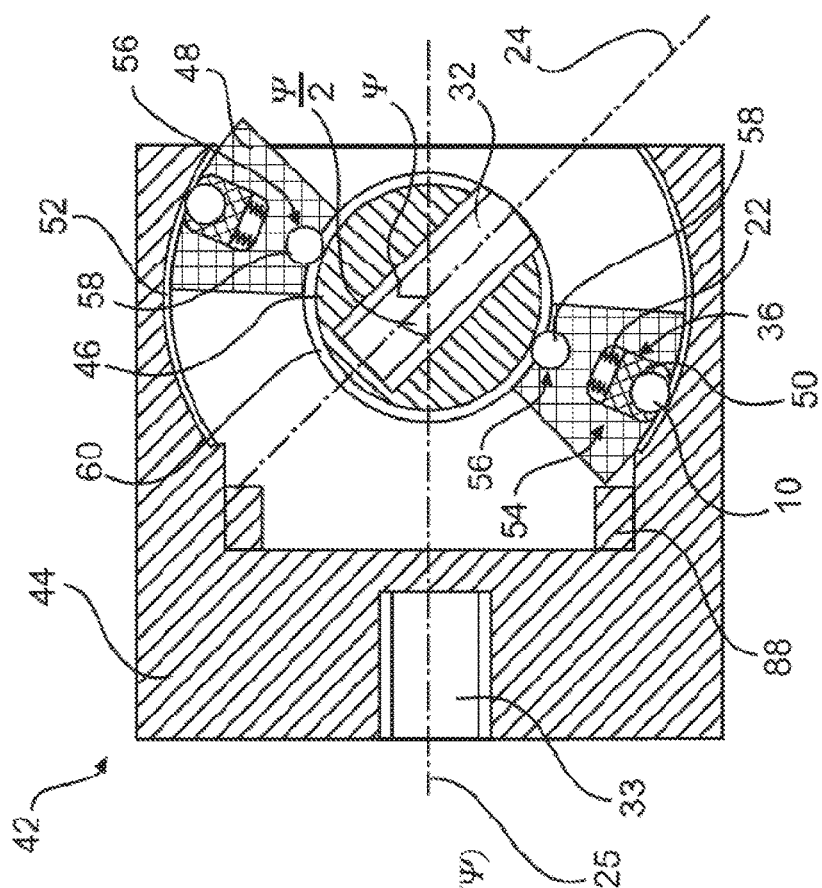
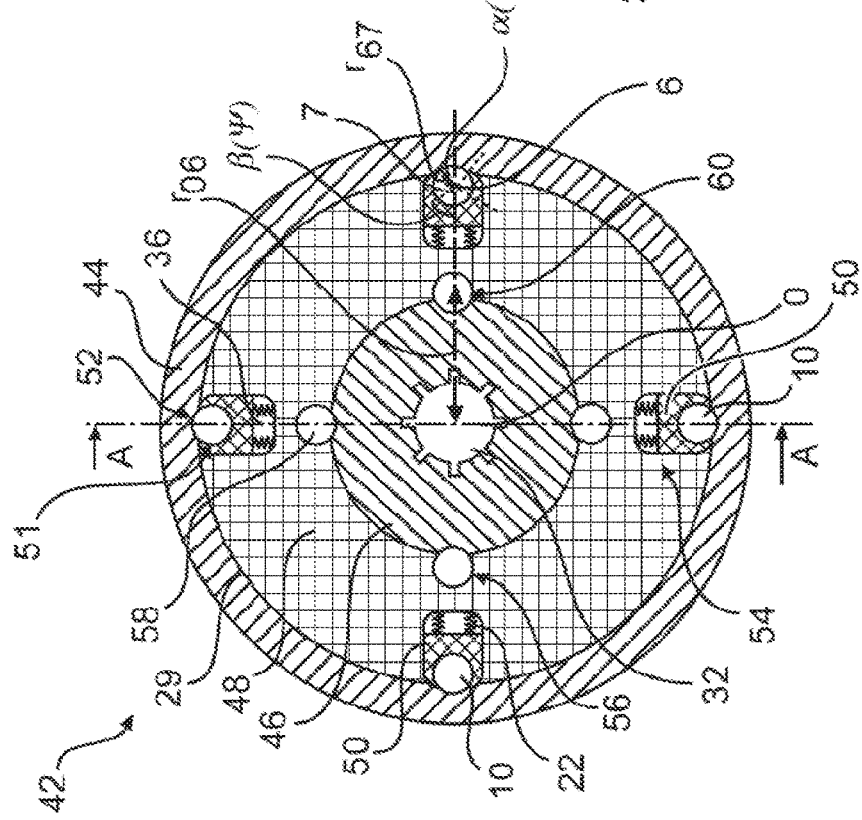
Fig.3b
Fig.3a

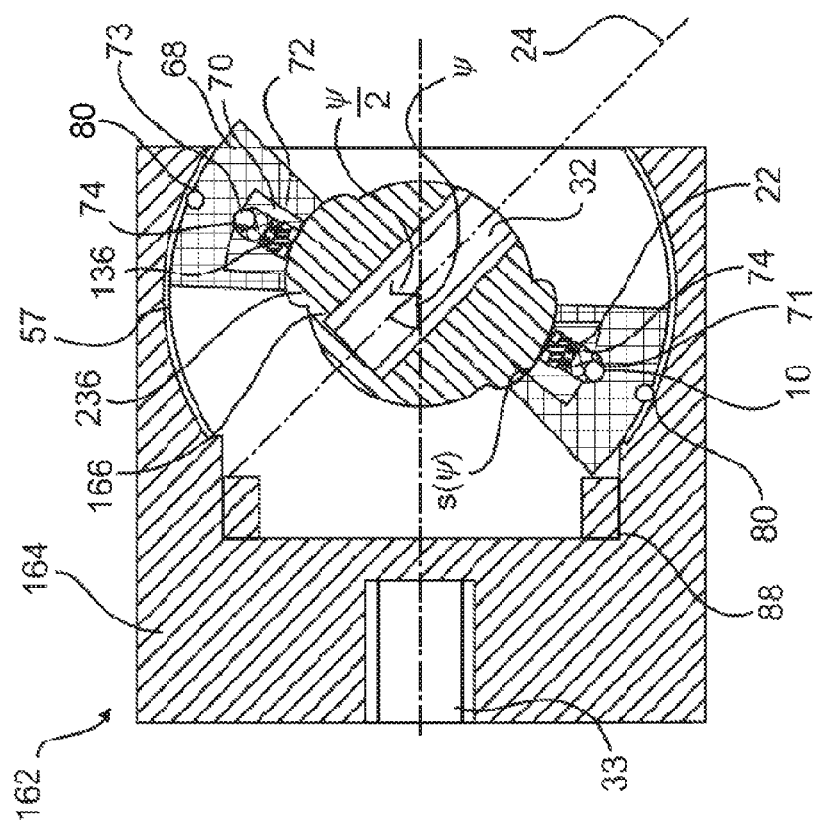
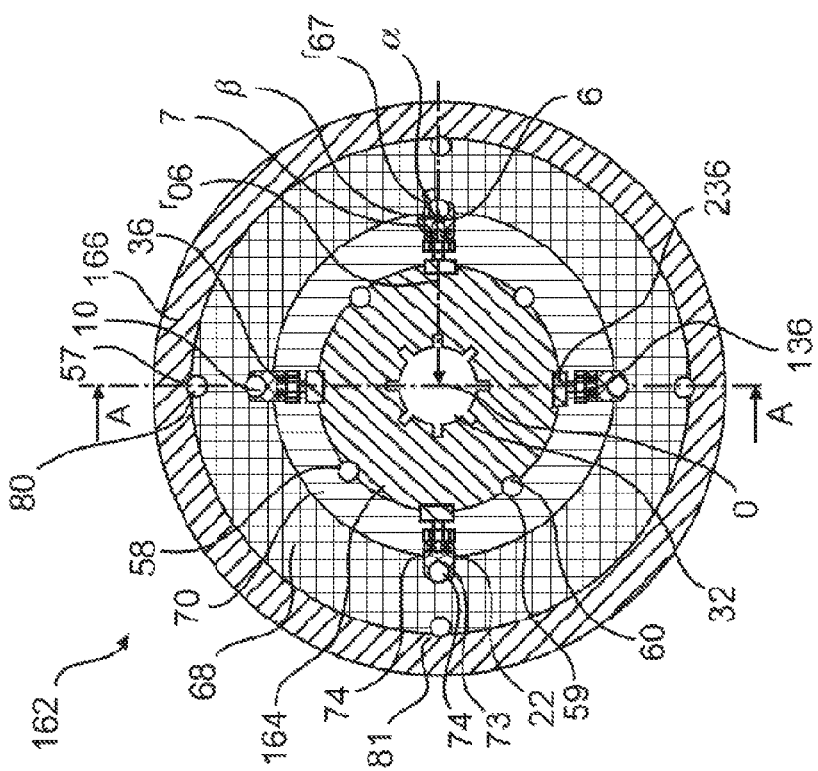
Fig. 4d
Fig. 4c

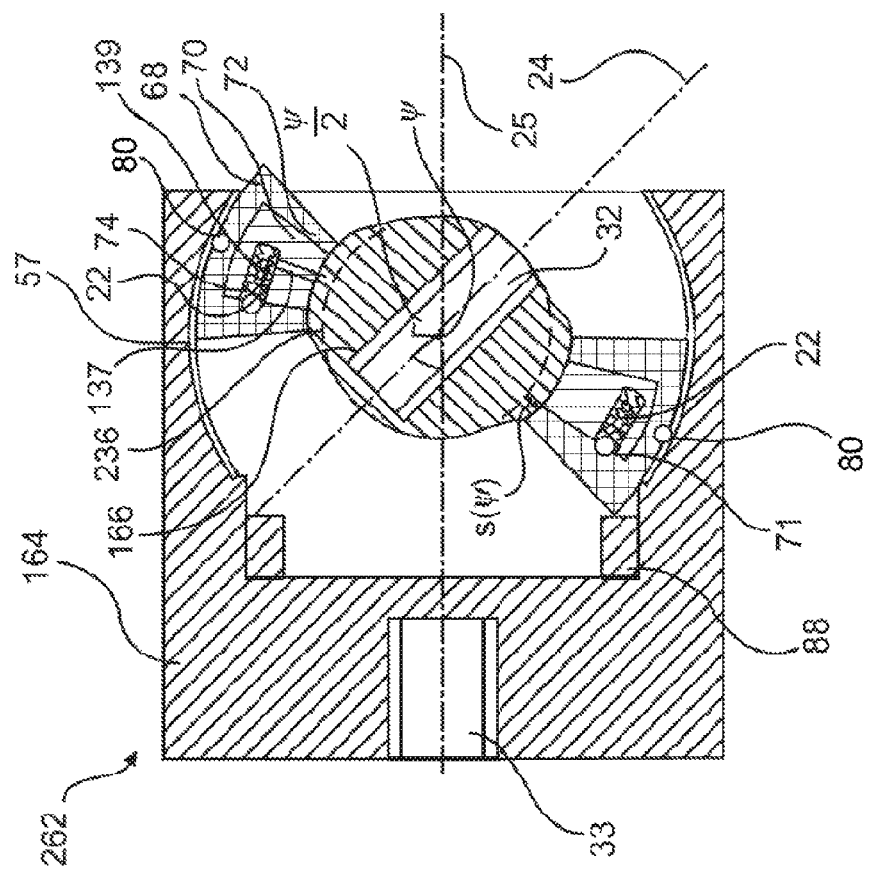
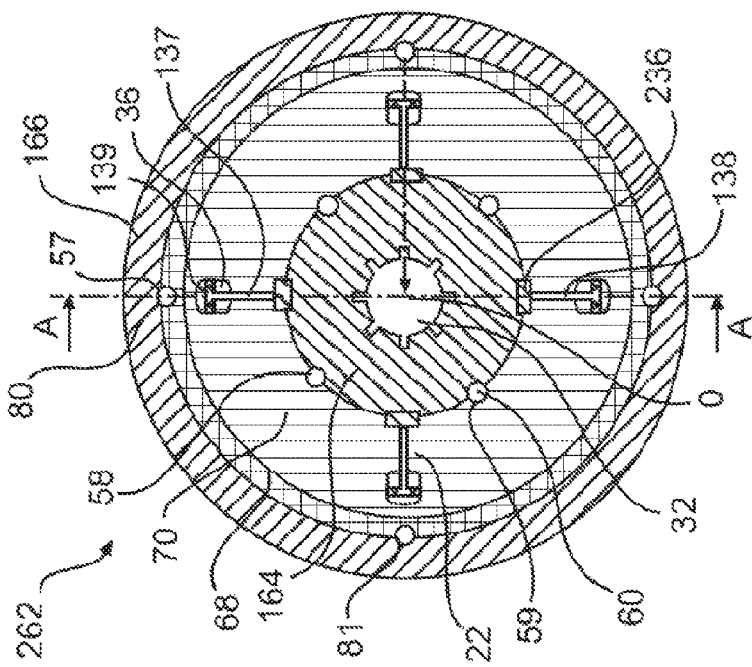
Fig.4f
Fig.4e

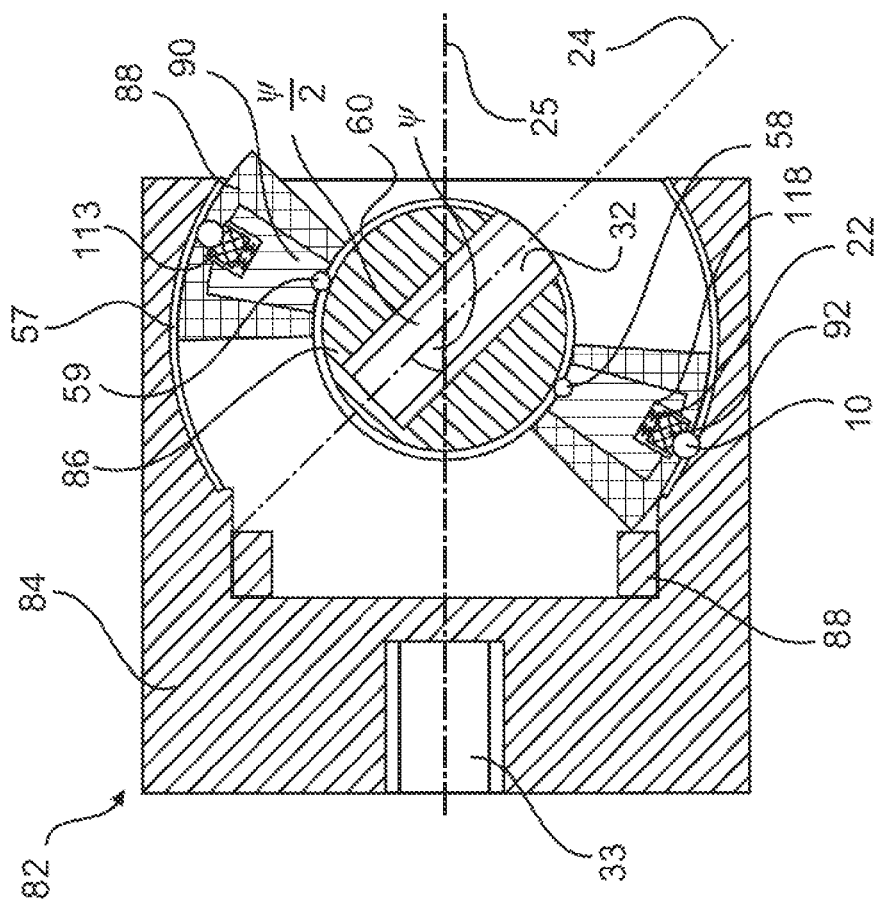
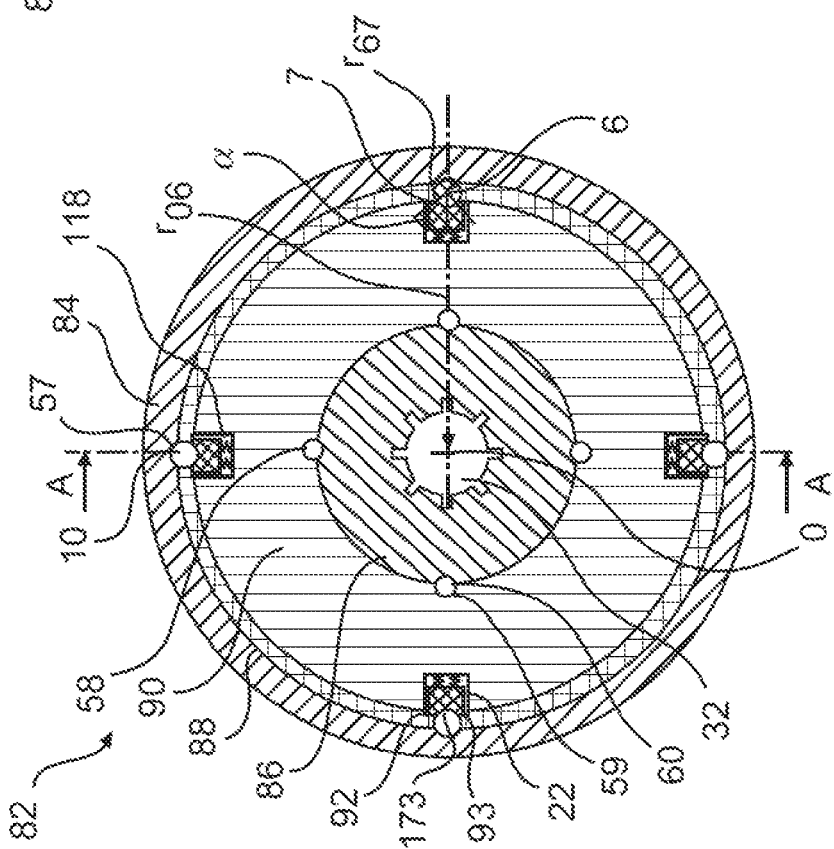

JOINT ARRANGEMENT, DRIVE SYSTEM FOR DRIVING CONTROL SURFACES OF AN AIRCRAFT AND AIRCRAFT WITH SUCH A DRIVE SYSTEM

TECHNICAL FIELD

The invention relates to a joint arrangement, a drive system for driving control surfaces of an aircraft and an aircraft with such a drive system.

BACKGROUND OF THE INVENTION

For transferring torque and rotational motion between two components that may comprise a variable angular relationship in view of their rotational axes it is known to use flexible joints that are able to compensate the relative angle. Besides cardan joints with inhomogeneous torque and speed characteristics it is known to use homokinetic joints. These comprise two joint components surrounding each other such that two spherical surfaces are arranged at a distance to and facing each other, wherein a number of balls is supported in a cage between these two surfaces. The balls are resting in grooves that allow the transfer of torque between the two components along their individual longitudinal or central axes and also allow the alteration of their relative angle to each other.

Typically, high lift systems of commercial and military aircraft are powered by a centralized power control unit (PCU) positioned in the fuselage of the aircraft and connected to a transmission shaft arrangement providing mechanical power to geared actuators at flap or slat panel drive stations. The transmission shaft arrangement comprises at least two transmission shafts, each extending from the PCU into a wing of the aircraft. Commonly, the transmission arrangement may also comprise several gearboxes, universal joints, spline joints and other components for compensating manufacturing tolerances, deflections of the wing structure during flight and changes in the extension direction of the transmission shaft from the PCU to the individual drive stations.

U.S. Pat. No. 1,916,442 discloses a homokinetic universal joint in which a driving and a driven member have the same angular velocity without angular acceleration or deceleration of a driving shaft due to a universal joint action. The universal joint comprises an outer joint component with ball grooves, an inner joint component with corresponding ball grooves, the inner joint component positioned in a hollow space of the outer joint component and a ball supporting cage located therebetween.

EP 1 462 361 B1 and U.S. Pat. No. 7,048,234 B2 disclose an adaptive flap and slat drive system for an aircraft comprising a central power control unit.

DE 3 620 886 C2 and U.S. Pat. No. 4,786,013 disclose a drive arrangement for a landing flap on an aircraft wing which includes a structure for variable torque limiting and position fixing.

BRIEF SUMMARY OF THE INVENTION

There may be a need to provide an apparatus that enables the harmonic transfer of torque between two shafts at an angle to each other and, at the same time, provide a simple, yet reliable limitation of torque resulting in a least possible weight, particularly for the use in an aircraft.

A joint arrangement is proposed, comprising an outer joint component having a spherical inner surface surrounding a hollow space and a first interface section, the inner surface comprising at least two outer ball recesses; an inner joint component positioned inside the hollow space of the outer joint component, the inner joint component having a spherical outer surface and a second interface section, the outer surface comprising at least two inner ball recesses; a spherical cage arranged in the hollow space between the inner surface of the outer joint component and the outer surface of the inner joint component, the cage comprising at least two openings extending from a side facing the outer joint component to a side facing the inner joint component; at least two balls and at least two pressing devices. Each of the outer ball recesses constitutes a ball recess pair with an inner ball recess and corresponds to an opening in the cage. The at least two balls are arranged in the outer ball recesses, the inner ball recesses and openings of the cage for transferring a torque from the first interface section to the second interface section. The at least two pressing devices are arranged in one of the inner joint component, the outer joint component and the cage, each in mechanical contact with one of the at least two balls. Furthermore, the at least two pressing devices are adapted for holding the at least two balls in a respective recess with a predetermined maximum pressing force for limiting a transferable torque of the joint arrangement.

Such a joint arrangement according to an embodiment of the invention is based on a homokinetic joint that allows a homogenous transfer of torque without alternating acceleration and deceleration due to the action of the joint itself. The outer joint component may comprise any suitable shape as long as a spherical inner surface may be provided. The spherical surface corresponds to a surface that is a part or a section of a sphere in order to allow for a relative motion of the inner joint component inside the outer joint component such as a joint head in a joint socket, while maintaining a predetermined distance between the inner and outer joint components. The inner joint component, which is positioned inside the hollow space of the outer joint component, therefore has an outer surface that is spherical as well and that corresponds to the inner surface of the outer joint component. Furthermore, the cage that holds the at least two balls, e.g. such as in a ball bearing device, is positioned between the inner surface and the outer surface in the joint arrangement. Other forms than spheres may be provided, e.g. countertracks like in WO 2008/080709 A1.

By placing the balls into the ball recesses, a mechanical shearing force may be transferred between the inner joint component and the outer joint component. Depending on the size and depth of the recesses, the size of the balls and the achievable forces of the pressing devices, a maximum shearing force to be transferred between these joint components is adjustable, such that a maximum transferable torque is definable, comparable to a ball ramp mechanism.

By providing such a radially flexible position support, the respective balls are not necessarily always placed in the corresponding ball recesses. By exceeding a predetermined maximum shearing force between the joint components acting on the respective balls, their radially flexible support may not be able to maintain the position. Consequently, they move radially and therefore leave the corresponding ball recesses. Due to the limited size of the recesses in the inner or outer surface of the joint components, the joint components may rotate relative to each other such that the inner ball recesses are not aligned with the outer ball recesses or any intermediate recess or torque transferring device. Hence, the transfer of torque ends.

The design principle of the joint arrangement according to an embodiment of the invention therefore combines a very homogeneous transfer of torque between two components at an angular relative position as well as an efficient limitation of transferable torque. The joint arrangement is reliable and substantially maintenance-free.

The joint arrangement may be connected to two rotating components by means of the first interface section and the second interface section, which may be flanges, shaft-hub-connections, indentations or recesses with a suitable torque transferring profile etc. The interface sections may preferably be realized by means of profiled surfaces e.g. inside the inner joint component to receive a correspondingly shaped shaft section, and e.g. at a side face of the outer joint component.

Due to the distinct reliability, the low complexity and the low weight, the joint arrangement according to an embodiment of the invention is predestined for a use in an aircraft, for example in a drive train of a high lift system. As described further below, the joint arrangement may be used for connecting transmission shaft sections of a transmission shaft system for a trailing edge flap arrangement or a leading edge slat arrangement.

Exemplarily, each of the outer ball recesses constitutes a ball recess pair with an inner ball recess and corresponds to an opening in the cage, wherein at least two first balls are arranged in the ball recess pairs and a corresponding opening of the cage. The setup of the joint arrangement is rather simple, yet extremely reliable and allows a compact installation space and a safe operation.

In an exemplary embodiment, the outer ball recesses are realized as outer ball grooves comprising a radius of curvature exceeding the radius of curvature of the respective balls, wherein the center of curvature of the outer ball grooves is distanced from a geometrical center of the outer joint component. Due to the different radii of curvature, the respective balls contact the outer ball recesses, i.e. the outer ball grooves, only at a single point. During normal operation, the pressing devices press the respective balls into the outer ball recesses. Due to the curvature of the outer ball recesses and the distance of the center of curvature and the geometrical center of the outer joint component, the balls only roll on the outer ball recesses if a pressing force and a corresponding counterforce are present. By providing a torque to be transferred that exceeds a predetermined maximum torque, the pressing devices are forced to radially move the respective balls such that the joint arrangement is released.

The radius of curvature of the ball grooves may be at least twice the radius of curvature of the respective balls, which allows a rather distinct degree of freedom for the first balls.

In a still further embodiment, the outer ball recesses are realized as outer ball grooves comprising a radius of curvature, which equals the radius of curvature of the respective balls. A central angle of a cross-section of the inner ball recess exceeds a central angle of a cross-section of the outer ball recess. Together with a suitably determined central angle of a cross-section of the outer ball recess on the inner joint component it is maintained that all respective balls begin with their rolling motion simultaneously. For example, the central angle of a cross-section of the outer ball recess may be determined by the following equation for an angle ψ between an outer and an inner joint component and a related cage position ψ/2:

$$\tan\alpha(\psi) = \frac{T}{F_S n_K r \cos^2 \frac{\psi}{2}}$$

wherein

T: torsional moment of the drive shaft $n_k$: number of respective balls,

α: central angle of a cross section of the outer ball grooves,

ψ: angle between the central axes of the joint components, r: distance between the centre of the joint and the centre of the balls, $F_S \cos(\psi/2)$: preload force by each pressing device on each ball.

The cross-sections are given in a plane that is perpendicular to a local extension of the ball recess in case the recess is a groove that extends over a certain length, which clearly exceeds its width. The cross-section may also extend through the geometrical center of the recess at least in case the recess is a mere spherical indentation. Hence, the recess in question may have a contour that is a segment of a circle. The angle ψ depends on the actual alignment of the central axes of the joint components relative to each other.

In another exemplary embodiment, the pressing devices are arranged in the cage and support at least two first balls in a radially flexible position relative to the cage. The cage comprises an inner cage surface having at least two rotatably supported second balls. The at least two second balls are arranged in corresponding inner recesses of the inner joint component. This leads to the fact that the first balls are directly acted upon a pressing force of the at least two pressing devices such that the pressing devices may be designed more conservatively, e.g. as cylindrical ball cups. Further, the preload is completely independent from the alignment angle between the rotational axes of the first and second joint components. Hence, it is possible to reduce the diversity of produced joint arrangements, which reduces the total manufacturing costs. Due to the independent pressing force on the first balls the central angle of a cross-section of the outer ball recess may be determined by the following equation:

$$\tan\alpha(\psi) = \frac{T}{F_S n_K r \cos \frac{\psi}{2}}$$

wherein $F_S$ is the preload force by each pressing device on each first ball independent of ψ.

In another exemplary embodiment, the cage is at least partially divided in a radial direction into a first cage part and a second cage part. The second cage part surrounds the first cage part at least partially, each of the first and second cage part having at least two cage part recesses arranged in corresponding positions. The pressing devices are arranged in one of the first cage part and the second cage part and support at least two first balls in a radially flexible position relative to one of the first cage part and the second cage part. The cage comprises an inner cage surface having at least two rotatably supported second balls and wherein the at least two second balls are arranged in corresponding outer recesses of the inner joint component. The cage comprises an outer cage surface having at least two rotatably supported third balls and the at least two third balls are arranged in corresponding inner ball recesses of the outer joint component. Again, the pressing force directly acts upon the first balls independent of the relative alignment angle between the first joint component and the second joint component in view of their rotational axes. Once a predetermined maximum torque is exceeded, the first balls are pressed into one of the first cage part and the second cage part. Consequently, the two cage parts may rotate relative to each other. The requirements for supporting the first balls are less strict for this arrangement as, for example, the inner cage part may be guided inside the second cage part and the first balls merely need to provide a linear motion between two substantially longitudinal, i.e. cylindric, indentations. Also, the pressing devices may be designed in a more conservative manner as in the previous embodiment, e.g. as cylindrical ball cups.

Preferably, the pressing devices may be realized as springs arranged in a pressing device recess, wherein each spring is in a mechanical contact with an end face of the pressing device recess and the respective first ball. The mechanical design of such a pressing device is simple and reliable. Further, the achievable pressing or preload force of the pressing device may easily be adjusted by replacing the spring, without having to alter the whole setup of the joint arrangement.

Furthermore, each first ball may be supported on a ball cup. In the ball cup, an appropriate ball recess may be arranged. If the pressing device comprises a spring, the spring may extend from an end face of a pressing device recess to an end face of the ball cup. Consequently, an even and harmonic introduction of the pressing force is achieved.

In an embodiment with swept wings the rotational vectors of the outer joint component, the cage and the inner joint components have the same length, but different directions. This may be used to integrate an electric generator into the joint arrangement. With the electric power produced by this electric generator a control device, actuator devices and sensors may be operated. Instead of springs, force sensors connectable to a control device may be installed. If the sensors detect an overload, the control device may initiate actuators, coupled to the ball cups, to pull the ball cups inwardly and to uncouple the outer joint component from the inner joint component.

The invention further relates to a drive system for control surfaces of an aircraft, comprising a power control unit, at least one transmission shaft having a plurality of transmission shaft sections and at least one drive station coupled with the drive system, wherein the transmission shaft sections are coupled by means of the joint arrangement described above.

Also, the invention relates to an aircraft having such a drive system.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

FIGS. 1a and 1b show a first exemplary embodiment of the joint arrangement in two perpendicular sectional views.

FIGS. 2a and 2b show a second exemplary embodiment of the joint arrangement with first balls and pressing devices in the cage in two perpendicular sectional views.

FIGS. 3a and 3b show a third exemplary embodiment of the joint arrangement with first balls, second balls and pressing devices in the cage in two perpendicular sectional views.

FIGS. 4a to 4f show fourth exemplary embodiments of the joint arrangement with first balls, second balls, third balls, a divided cage and pressing devices in the cage in sectional views.

FIGS. 5a to 5d show fifth exemplary embodiments of the joint arrangement with first balls, second balls, a divided cage and pressing devices in the cage in sectional views.

DETAILED DESCRIPTION

Figure 4B:
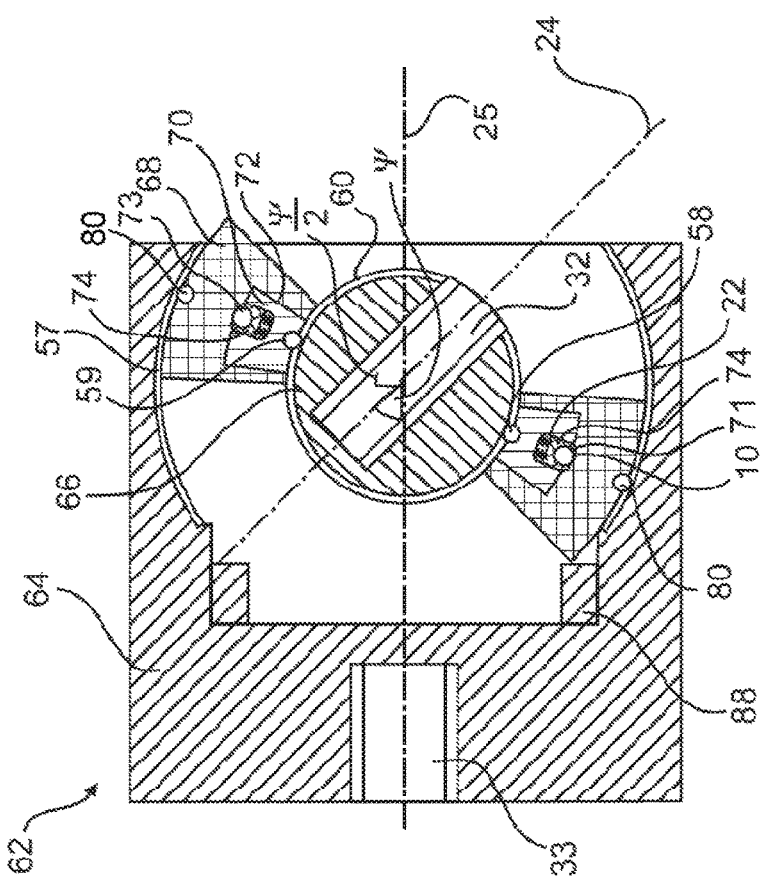

FIG. 1a shows a joint arrangement 2 comprising an outer joint component 4, an inner joint component 6, a spherical cage 8, four first balls 10 as well as four corresponding pressing devices 12. The outer joint component 4 comprises a hollow space 16, in which the inner joint component 6 and the cage 8 are arranged.

The cage 8 comprises openings 14 that are adapted for guiding the first balls 10 between the inner joint component 6 and the outer joint component 4. Exemplarily, the pressing devices 12 are arranged at the inner joint component 6 and comprise a recess 16 into which recess 16, e.g. a bushing, ball cups 18 may be moved. The crescent-shaped ball cups 18 are guided by means of linear guides 20 located at the side faces of the recess 16 and comprise an inner ball recess 19. The first balls 10 contact the inner ball recesses 19 by means of a circular contact line. The guides 20 run parallel to a sectional plane marked as "AA" and vertically to a sectional plane marked "BB". The outward motion of the ball cups 18 may be limited by end stops 31 engaging correspondingly shaped steps of the ball cups 18. Between an underside of the ball cups 18 and the interior end face of the recess 16, springs 22 are located. By a force acting upon the first balls 10 into the direction of the recess 16, the ball cups 18 move inwardly, i.e. into the direction of a central axis 24. The inner ball recess 19 is a meridional groove, in which the first balls 10 may roll, clearly visible in FIG. 1b. In contrast, the recess 16 is a groove with a ground, comparable to a stud hole, extending parallel to the axis 24 of the inner joint component and exemplarily comprising a substantially rectangular or another non-circular or circular cross-section suitable to allow the ball-cup 18 to move inwardly.

The joint arrangement 2 is designed for transferring torque between the inner joint component 6 and the outer joint component 4. For the sake of clarifying the general setup the inner joint component 6 and the outer joint component 4 are arranged parallel to each other in the drawing of FIG. 1a. For the purpose of transferring torque, the outer joint component 4 comprises four outer ball recesses 28 on an inner surface of the outer joint component 4. By providing a rotation of the inner joint component 6 or the outer joint component 4, the first balls 10 transfer a shearing force due to the pressing action of the pressing devices 12, which may be realized by pre-loaded springs. Due to the shearing force acting upon the outer recesses 28, the outer joint component 4 rotates with the same speed as the inner joint component 6, unless the shearing force exceeds a predetermined limit.

If this is the case, the pressing force upon the first balls 10 is insufficient to maintain their position in the outer recesses, such that the first balls 10 are moving in a radial direction onto an inner surface 29 of the outer joint component located between the outer recesses 28, which inner surface 29 does not allow the transfer of a shearing force, which leads to the interruption of the transfer of torque. The inner surfaces 29 separate the outer recesses 28 from each other and comprise a smaller distance to the central axis 24 than the outer recesses 28. To prevent the loss of the ball cups 18, the pressing devices 12 include end stops 30 that are adapted to hold the ball cups 18 in an outermost position. As the transition between the outer recesses 28 and the inner surfaces 29 may be smooth, the first balls 10 may conduct a slight lateral motion in the outer recesses 28, which may slightly damp harsh changes in the torque to be transferred.

The outer ball recesses 28 comprise a radius of curvature which clearly exceeds the radius of curvature of the first balls 10, but which may be lower than the radius of curvature of the inner surfaces 29 between the outer ball recesses 28 in a circumferential direction. Furthermore, the center of curvature of the outer ball recesses 28 is located in a distance to the central axis 24. For example, the center of curvature may be positioned between the central axis 24 and the corresponding end face of the ball cup 18. Exemplarily, four centres 30a-30d of curvature of the outer recesses 28 are indicated in FIG. 1a. This has the effect that the first balls 10 may only start to roll on the inner surface 28 when they are moved into the direction of the central axis 24. However, such an inward motion of the ball cups 18 is prevented in normal operation by the pressing devices 12.

FIG. 1b shows a sectional view perpendicular to the sectional view shown in FIG. 1a. The sectional plane for the view in FIG. 1b is indicated by "AA" in FIG. 1a. However, FIG. 1a shows parallelly arranged first and second interface sections 33 and 32, while FIG. 1b shows angular first and second interface sections 33 and 32. The same applies for FIGS. 2b, 3b, 4b, 4d, 4f, 5b and 5d.

In FIG. 1b the outer joint component 4 and the inner joint component 6 are aligned in an angle to each other. A first interface section 33, which is realized as a recess, allows receiving a drive shaft, is arranged in the outer joint component 4 and is situated around a longitudinal axis 25 of the outer joint component 4. In analogy, a second interface section 32, realized as a recess, is arranged in the inner joint component 6, allows receiving a drive shaft and is situated around a longitudinal axis 24 of the inner joint component 24. The recesses 32 and 33 may be of a pinion type.

On introduction of a torque through one of the interface sections 32 or 33 into the inner joint component 6 or outer joint component 4, the first balls 10 transfer a shearing force through the inner recess 19 and the outer recess 28, while conducting a balancing motion along the inner recess 19 and the outer recess 28 while the cage 8 maintains the relative positions of the first balls 10. End stops 88 limit the radial motion of the cage 8 in the direction of an angle between the axes 24 and 25 in the drawing plane of FIG. 1b, which is referred to as the alignment angle ψ in the following.

The basic design and setup of the joint arrangement according to FIGS. 1a and 1b is rather simple and of a light weight, yet a reliable operation may be accomplished.

FIG. 2a shows a slight modification in form of a joint arrangement 35 with an outer joint component 34, an inner joint component 36 and a cage 38. Here, also four first balls 10 are arranged between ball cups 18 having inner ball recesses 41 and the outer joint component 34. The outer joint component 34 comprises outer ball recesses 40 that have the same radius of curvature compared to the first balls 10. Hence, the first balls 10 contact the outer joint component 34 by means of a circle.

A central angle α of a cross-section of the inner ball recesses 40 is less than a central angle β of a cross-section of the inner ball recesses 41 for maintaining a simultaneous rolling motion of the first balls 10 once the predetermined maximum torque is exceeded. An angle β exceeding 90° prevents the first balls 10 from leaving the ball cups 18. As the pressing force onto the first balls 10 depends on an alignment angle ψ the necessary central angle α depends on the angle ψ as well and may be calculated by the previously mentioned equation:

$$\tan\alpha(\psi) = \frac{T}{F_S n_K r_{06} \cos^2 \frac{\psi}{2}}$$

wherein
T: torsional moment of a drive shaft,
$n_k$: number of first balls 10,
$r_{06} \cos(\psi/2)$: distance between a joint centre 0 and centres 6 of first balls 10,
$F_S \cos(\psi/2)$: preload force of ball cup 18,
ψ: angle between the central axes of the joint components, bordered by body stops 88.

Hence, the relationship between the torque limit and the preload force of the ball cups 18 depends on the alignment angle ψ. The drive shaft mentioned above may be a shaft which is introduced into the second interface section 32.

As rendered clear by FIG. 2b the outer ball recesses 40 are realized as a circle segment inside the outer joint component 34. The distance between the joint centre 0 and the ground of the outer ball recess 40 is $r_{06}+r_{67}$, where $r_{67}$ is the radius of the first balls 10. Correspondingly, the inner ball recesses 41 are circle segments at an outer surface of the crescent-shaped ball cups 18. This allows for different alignment angles ψ, which may be measured in various spatial directions. The edge between the surface 29 and the recess 40 is labelled as 7. To maintain a simultaneous initiation of moving of the first balls 10 in case of overload the depth of the outer ball recesses 40 at a cage position ψ/2 is $$r_{67}(1-\cos\alpha(\psi)).$$

The distance $r_{029}$ between the joint centre 0 and the surface 29 of the first balls 10 at a cage position ψ/2 follows to $$r_{029}=r_{06}+r_{67}\cos\alpha((\psi)).$$

The surface 29 is not part of a spherical shape.

FIGS. 3a and 3b show a further joint arrangement 42 with an outer joint component 44, an inner joint component 46 and a cage 48 situated between the inner joint component 46 and the outer joint component 44. Here, first balls 10 reside in substantially cylindrical ball cups 50 that comprise a ball recess 51 extending over more than one half of the first balls 10 such that they may not exit the ball cups 50 without large force. The first balls 10 are also slidably supported by outer ball recesses 52 arranged in the outer joint component 44 and pressed outwardly in a radial direction by pressing devices 54.

By placing the pressing devices 54 inside the cage 48, the pressing devices 54 directly act upon the first balls 10 such that the necessary preload force for maintaining a predetermined torque limit is completely independent from the alignment angle ψ between the first joint component 44 and the second joint component 46.

The central angle α of the cross-section of the outer ball recesses 52 may therefore be calculated by the previously mentioned equation, in which the force $F_s$ does not need to be divided into separate force fractions for different directions, according to following equation:

$$\tan\alpha(\psi) = \frac{T}{F_s n_K r_{06} \cos\frac{\psi}{2}}$$

wherein

T: torsional moment of the drive shaft, $n_k$: number of first balls 10, $r_{06} \cos(\psi/2)$: distance between the joint centre 0 and centres 6 of first balls 10, $F_s$: preload force of the ball cup 50, $\psi$: angle between drive shaft and driven shaft, bordered by the body stop 88.

The edge between an inner surface 29 of the outer joint component 44 and the outer recess 52 is labelled as 7. To maintain a simultaneous initiation of motion of the first balls 10 in case of overload, the depth of the outer recess 52 at a cage position $\psi/2$ follows to:

$r_{67}(1-\cos\alpha(\psi))$.

The distance $r_{029}$ between the joint centre 0 and the inner surface 29 at a cage position $\psi/2$ follows to:

$r_{029} = r_{06} + r_{67} \cos\alpha((\psi))$.

The inner surface 29 is not part of a spherical shape.

For coupling the cage 48 with the inner joint component 46, second balls 58 are provided that sit in the cage 48 and extend into inner ball recesses 60 located on the inner joint component 46. Consequently, when a predetermined maximum torque is exceeded, the first balls 10 and the ball cups 50 are pressed towards the central axis 24 under compression of the pressing devices 54 such that the cage 48 may freely rotate relative to the outer joint component 44. The recess 51 of the ball cup 50 for the first balls 10 has a spherical shape, the ball cup 50 has a cylindrical form, the ball cup sits in a cylindrical recess 36. An angle β exceeding 90° prevents the first balls 10 from leaving their ball cups.

In FIG. 3b, it is shown in more detail how the inner joint component 46, the cage 48 and the outer joint component 44 are coupled. For example, the inner joint component 46 comprises two inner ball recesses 60 parallel to the drawing plane in FIG. 3b that join each other such that a single substantially circular inner ball recess 60, which extends over the whole circumference of the inner joint component 46 in the drawing plane of FIG. 3b, is created. Therefore, the inner joint component 46 may freely rotate around an axis perpendicular to the drawing plane. It is clear that another inner ball recesses 60 shown in FIG. 3a parallel to the axis 25 may also extend over a whole circumference in the plane vertical to the drawing plane of FIG. 3a. The cage 48 comprises spherical ball recess 56 for holding the second balls 58.

In analogy, the outer ball recesses 52 extend over a circular segment over exemplarily approximately 70° of the inner surface of the outer joint component 44. Since the pressing force is applied directly within the cage 48 onto the first balls 10, the alignment of the central axis 24 of the inner joint component 46 and a central axis 25 of the outer joint component 44 is not relevant for the pressing force onto the first balls 10.

Figure 4A:
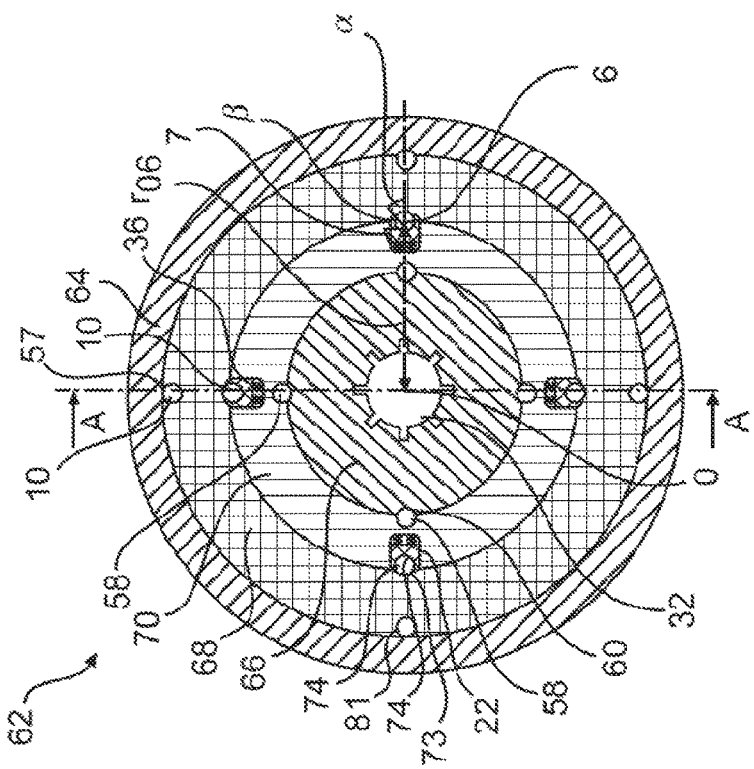

FIGS. 4a and 4b show a further exemplary embodiment in form of a joint arrangement 62 having an outer joint component 64, an inner joint component 66 as well as a cage with an outer cage part 68 and an inner cage part 70, which resides in a correspondingly formed annular cut-out 72 of the outer cage part 68. Third balls 80 are arranged in the outer cage part 68 and run in outer ball recesses 57. Second balls 58 are arranged in the inner cage part 70 and run in inner recesses 60 in order to introduce the rotational motion from the inner joint component 66 to the cage parts 68 and 70.

Additionally, first balls 10 are arranged between the outer cage part 68 and the inner cage part 70 and reside in substantially cylindrical ball cups 74 that are slidably arranged in the inner cage part 70. The first balls 10 are in contact with a cage part recess 71 of the outer cage part 68. In the embodiment of FIGS. 4a and 4b the simultaneous initiation of motion of the first balls 10 in case of overload cannot be maintained by varying the angle α and the distance $r_{029}$ in $\psi$-direction.

Therefore in FIGS. 4c and 4d for a fixed angle α the preload force $F_s$ is varied by an variable ground of a recess 36 (as introduced in FIG. 3a), which is connected over a lever 136 to a radial cam 236. The second balls 58 are arranged by 45° relative to the radial cams 236 and the radial cam 236 is part of the inner joint component 66.

By means of the radial cams 236 the preload force acting upon the first balls 10 is adjusted due to the variable ground of the recess. With a rising angle $\psi$ the preload force is increased, since the lever 136 is pushed to increase the compression of the springs 22 by a rising local height s of the cams.

With a preload $F_s = c_s\ s(\psi)$ the form of the radial cam is defined over $$s(\psi) = \frac{T}{c_s n_K r_{06} \cos\frac{\psi}{2} \tan\alpha}$$

wherein

T: torsional moment of the drive shaft, $n_k$: number of first balls 10, $r_{06} \cos(\psi/2)$: distance between joint centre 0 and centres 6 of first balls 10, $c_s$: spring constant of spring 22, $s(\psi)$ height of the radial cam at a cage position $\psi/2$ $\psi$: angle between drive shaft and driven shaft, bordered by body stops 88.

The central angle α of the cross-section of the cage part recesses 71 may therefore be calculated as in the previous exemplary embodiment, as the force $F_s$ directly acts upon the first balls 10 and independent from alignment angle $\psi$.

Hence, by exceeding a predetermined maximum torque, the inner cage part 70 and the outer cage part 68 start to rotate relative to each other as the first balls 10 are displaced in a radial direction towards the central axis 24, 25 and their intersection, respectively.

FIGS. 4e and 4f show an embodiment of a joint arrangement 262, which is a modification of the joint arrangement 162 according to FIGS. 4c and 4d. Here, the ball cups 74 and the movement of the first balls 10 are substantially parallel to the axis 24, similar to a common ramp mechanism.

Figure 5D:
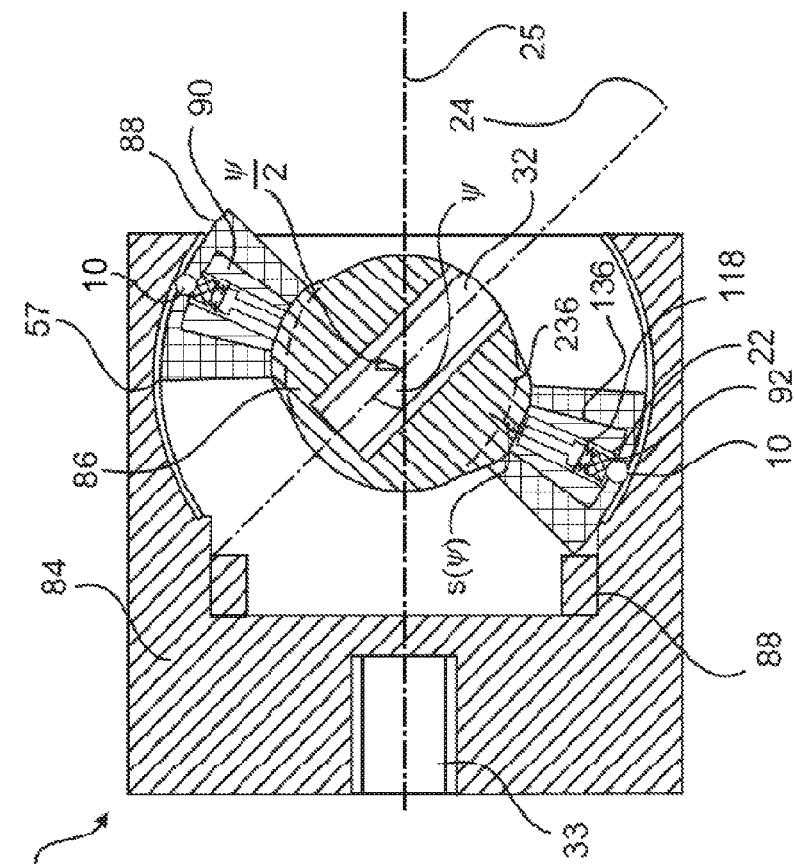
Figure 5C:
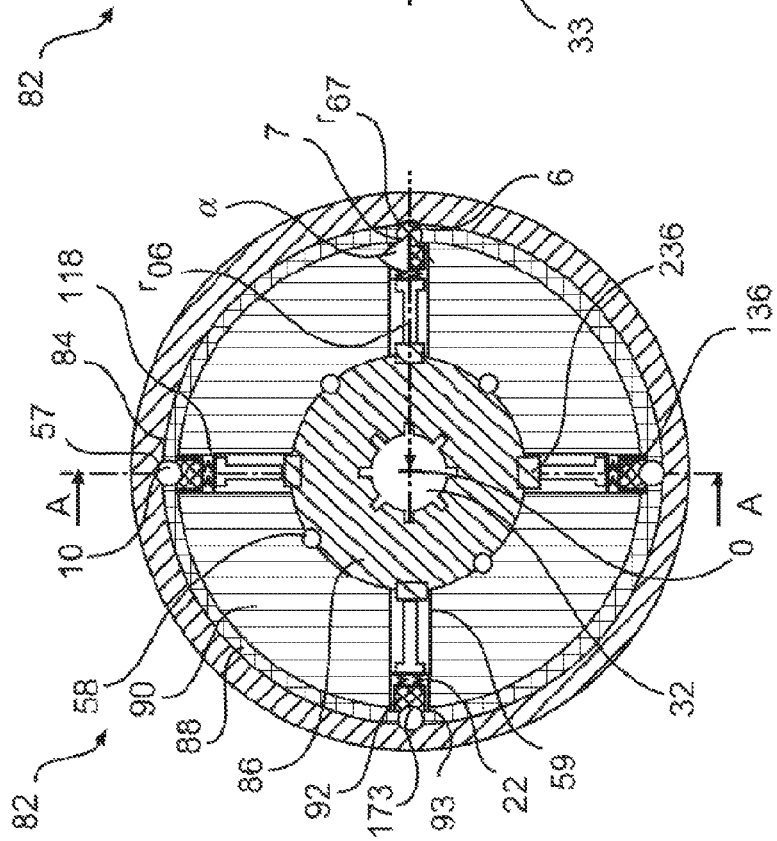

FIGS. 5a to 5d show still further joint arrangements. FIGS. 5a and 5b show a joint arrangement 82, comprising an outer joint component 84, an inner joint component 86 as well as an outer cage part 88 and an inner cage part 90, constituting a cage. Different than in FIGS. 4a and 4b, the inner cage part 90 has an outer diameter slightly below the outer diameter of the outer cage part 88 and therefore dominates the cage. Instead of using third balls, the first balls 10 reside in ball cups 92 slidably located in the inner cage part 90 and extending from the inner cage part 90 through the outer cage part 88 into the outer joint component 84. While exceeding a predetermined maximum torque, the ball cups 92 are displaced towards the rotational axis 24 and 25, respectively, such that the inner cage part 90 and the outer cage part 88 start to rotate relative to each other. In contrast to FIG. 1a, 1b, 2a, 2b, 3a, 3b, 4a and 4b the first balls 10 remains in the cage 88 meanwhile the ball cups 92 glides under the cage 88 without the first balls 10.

In the embodiment of FIGS. 5a and 5b the simultaneous initiation of motion of the first balls 10 in case of overload cannot be maintained by varying the angle $\alpha$ and the distance $r_{029}$ in $\psi$-direction. Therefore in FIGS. 5c and 5d for a fixed angle $\alpha$ the preload force $F_s$ is varied by an alterable ground 118 of the recess 36, which is connected over a lever 136 to the radial cam 236. The second balls 58 are arranged by 45° and the radial cam 236 is part of the inner joint component 66.

With the preload $F_s=c_s s(\psi)$ the form of the radial cam is defined over $$s(\psi) = \frac{T}{c_s n_K r_{06} \cos\frac{\psi}{2} \tan\alpha}$$

wherein
T: torsional moment of the drive shaft,
$n_k$: number of balls,
$r_{06} \cos(\psi/2)$: distance between joint centre 0 and centre 6 of first balls 10,
$c_s$: spring constant of spring 22,
$s(\psi)$: height of the radial cam at a cage position $\psi/2$,
$\psi$: angle between drive shaft and driven shaft, bordered by body stops 88.

Figure 6:
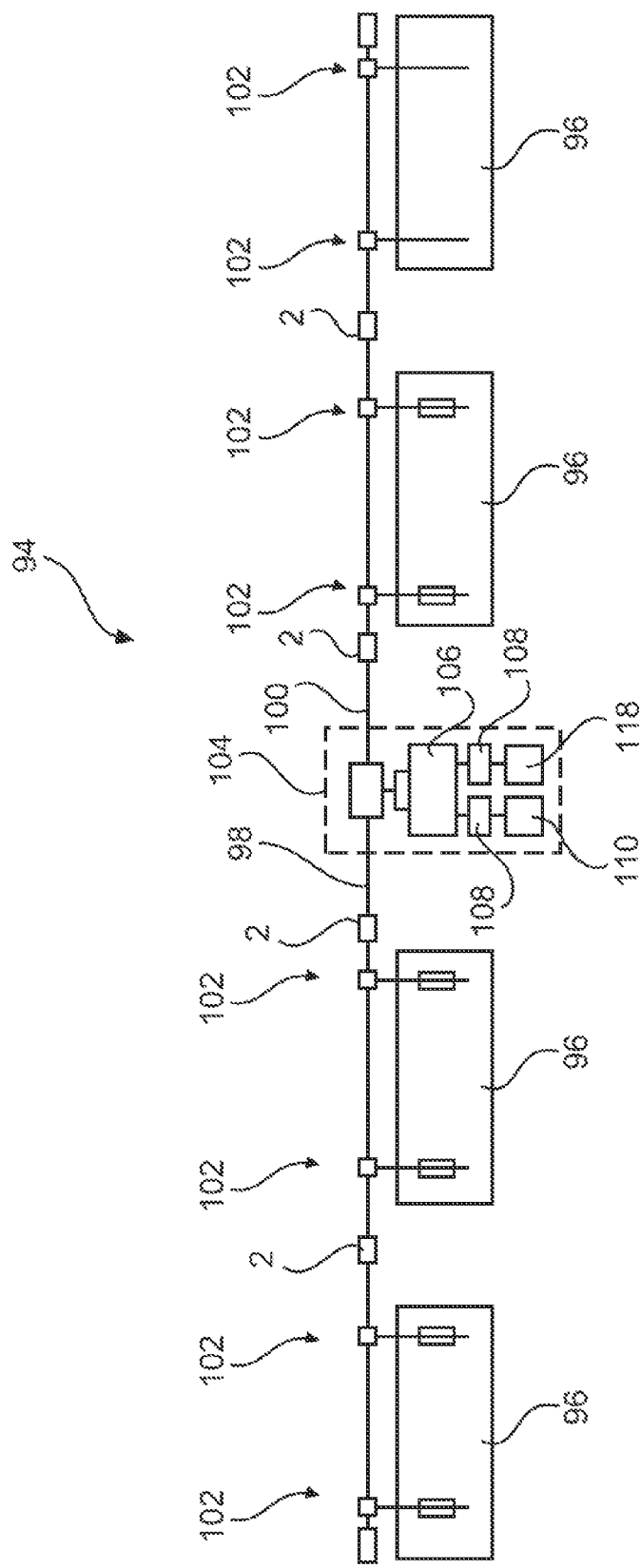
FIG. 6 shows a drive system for a high lift system of an aircraft.

FIG. 6 shows a general overview of a drive system 94 of an aircraft for driving control surfaces 96, which may be trailing edge flaps or leading edge slats. The drive system 94 comprises a first transmission shaft 98 on a left side as well as a second transmission shaft 100 on a right side of the drive system 94, in order to provide rotational power to drive stations 102 coupled with the control surfaces 96. Several of these drive stations 102 are exemplarily distributed along a trailing and/or leading edge of each wing and are designed for converting rotary power into a translational movement of the control surfaces 96. The transmission shaft 32 and 34 are driven by a PCU 104, comprising a speed summing differential 106, two pressure or power off brakes 108 and two motor units 110. The PCU 104 is exemplarily located inside a fuselage of the aircraft. The PCU 104 is connected by the shaft 198 to the joint arrangement 2, 32, 42, 62, 162 and 82, which is connected by the shaft 200 to the T-gearbox 111. The Wing Tip Break (WTB) is labelled as 112.

The transmission shafts 98 and 100 each may comprise joint arrangements 2, 32, 42, 62, 162 and 82 for compensation alignment alterations in the wing, which may also be effected by wing flexing. Due to the use of the joint arrangement 2, 32, 42, 62, 162 and 82 according to embodiments of the invention, the transferred torque is harmonic and the rotational speed does not accelerate or decelerate due to immanent characteristics of the joints. With a homokinetic joint 2, 32, 42, 62, 162 and 82 it is easier to change the wing sweepback over the wing span. Also a wing with a pivoting sweepback, comparable to the TORNADO or F14, may become simpler to design.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A joint arrangement comprising:
an outer joint component having a spherical inner surface surrounding a hollow space and a first interface section, the inner surface comprising at least first and second outer ball recesses;
an inner joint component positioned inside the hollow space of the outer joint component, the inner joint component having a spherical outer surface and a second interface section, the outer surface comprising at least first and second inner ball recesses;
a spherical cage arranged in the hollow space between the inner surface of the outer joint component and the outer surface of the inner joint component, the cage comprising at least first and second openings extending from a side facing the outer joint component to a side facing the inner joint component;
at least first and second balls; and
at least first and second pressing devices,
wherein the at least first and second balls are arranged in the first and second outer ball recesses, the first and second inner ball recesses and the first and second openings, respectively, of the cage for transferring a torque from the first interface section to the second interface section,
wherein the at least first and second pressing devices are arranged in one of the inner joint component, the outer joint component and the cage, each in mechanical contact with one of the at least first and second balls,
wherein the at least first and second pressing devices are adapted for holding the at least first and second balls in a respective recess with a predetermined maximum pressing force for limiting a maximum transferable torque of the joint arrangement.

2. The joint arrangement of claim 1,
wherein each of the outer ball recesses constitutes a ball recess pair with an inner ball recess and corresponds to an opening in the cage, and
wherein at least first and second first balls are arranged in the ball recess pairs and a corresponding opening of the cage.

3. The joint arrangement of claim 1,
wherein the outer ball recesses comprise outer ball grooves comprising a radius of curvature exceeding the radius of curvature of the respective balls arranged therein, and
wherein the center of curvature of the outer ball grooves is distanced from a geometrical center of the outer joint component.

4. The joint arrangement of claim 3, wherein the radius of curvature of the ball grooves are at least twice the radius of curvature of the respective balls arranged therein.

5. The joint arrangement of claim 1,
wherein the outer ball recesses comprise outer ball grooves comprising a radius of curvature equaling the radius of curvature of the respective balls arranged therein, and
wherein a central angle (β) of a cross-section of the inner ball recess exceeds a central angle (α) of a cross-section of the outer ball recess.

6. The joint arrangement of claim 1,
wherein the pressing devices are arranged in the cage and support the respective balls in a radially flexible position relative to the cage, and
wherein the cage comprises an inner cage surface having at least first and second rotatably supported second balls, and
wherein the at least first and second second balls are arranged in corresponding inner recesses.

7. The joint arrangement of claim 1,
wherein the cage is at least partially divided in a radial direction into a first cage part and a second cage part,
wherein the second cage part surrounds the first cage part at least partially, each of the first and second cage part having at least first and second cage part recesses arranged in corresponding positions,
wherein the pressing devices are arranged in one of the first cage part and the second cage part and support the at least first and second first balls in a radially flexible position relative to one of the first cage part and the second cage part,
wherein the cage comprises an inner cage surface having at least first and second rotatably supported second balls and wherein the at least first and second second balls are arranged in corresponding inner recesses of the inner joint component, and
wherein the cage comprises an outer cage surface having at least first and second rotatably supported third balls and wherein the at least first and second third balls are arranged in corresponding outer ball recesses of the outer joint component.

8. The joint arrangement of claim 1,
wherein the pressing devices comprise springs arranged in pressing device recesses, and
wherein each spring is mechanically coupled with an end face of the pressing device recess and the respective ball.

9. The joint arrangement of claim 1, wherein each first ball is supported on a ball cup.

10. The joint arrangement of claim 1, wherein at least two of the outer joint component, the inner joint component and the cage are adapted to constitute an electric generator.

11. The joint arrangement of claim 1, wherein the at least first and second pressing devices provide a radially flexible position support to the at least first and second balls, respectively.

12. The joint arrangement of claim 1, wherein, if a predetermined maximum shearing force between the outer joint component and the inner joint component is exceeded, at least one of the first and second balls is configured to move radially and leave the corresponding outer ball recess.

13. A drive system for control surfaces of an aircraft, comprising:
a power control unit;
at least one transmission shaft having a plurality of transmission shaft sections; and
at least one drive station,
wherein the transmission shaft sections are coupled by a joint arrangement comprising:
an outer joint component having a spherical inner surface surrounding a hollow space and a first interface section, the inner surface comprising at least first and second outer ball recesses;
an inner joint component positioned inside the hollow space of the outer joint component, the inner joint component having a spherical outer surface and a second interface section, the outer surface comprising at least first and second inner ball recesses;
a spherical cage arranged in the hollow space between the inner surface of the outer joint component and the outer surface of the inner joint component, the cage comprising at least first and second openings extending from a side facing the outer joint component to a side facing the inner joint component;
at least first and second balls; and
at least first and second pressing devices,
wherein the at least first and second balls are arranged in the first and second outer ball recesses, the first and second inner ball recesses and the first and second openings, respectively, of the cage for transferring a torque from the first interface section to the second interface section,
wherein the at least first and second pressing devices are arranged in one of the inner joint component, the outer joint component and the cage, each in mechanical contact with one of the at least first and second balls,
wherein the at least first and second pressing devices are adapted for holding the at least first and second balls in a respective recess with a predetermined maximum pressing force for limiting a maximum transferable torque of the joint arrangement.

14. An aircraft comprising:
a drive system comprising:
a power control unit;
at least one transmission shaft having a plurality of transmission shaft sections; and
at least one drive station,
wherein the transmission shaft sections are coupled by a joint arrangement comprising:
an outer joint component having a spherical inner surface surrounding a hollow space and a first interface section, the inner surface comprising at least first and second outer ball recesses;
an inner joint component positioned inside the hollow space of the outer joint component, the inner joint component having a spherical outer surface and a second interface section, the outer surface comprising at least first and second inner ball recesses;
a spherical cage arranged in the hollow space between the inner surface of the outer joint component and the outer surface of the inner joint component, the cage comprising at least first and second openings extending from a side facing the outer joint component to a side facing the inner joint component;
at least first and second balls; and
at least first and second pressing devices,
wherein the at least first and second balls are arranged in the first and second outer ball recesses, the first and second inner ball recesses and the first and second openings, respectively, of the cage for transferring a torque from the first interface section to the second interface section,
wherein the at least first and second pressing devices are arranged in one of the inner joint component, the outer joint component and the cage, each in mechanical contact with one of the at least first and second balls, wherein the at least first and second pressing devices are adapted for holding the at least first and second balls in a respective recess with a predetermined maximum pressing force for limiting a maximum transferable torque of the joint arrangement.

\* \* \* \* \*